Oct. 10, 1933.  J. B. WEAVER  1,929,861
METHOD AND APPARATUS FOR CONTINUOUSLY TREATING PETROLEUM DISTILLATES
Filed Oct. 9, 1930
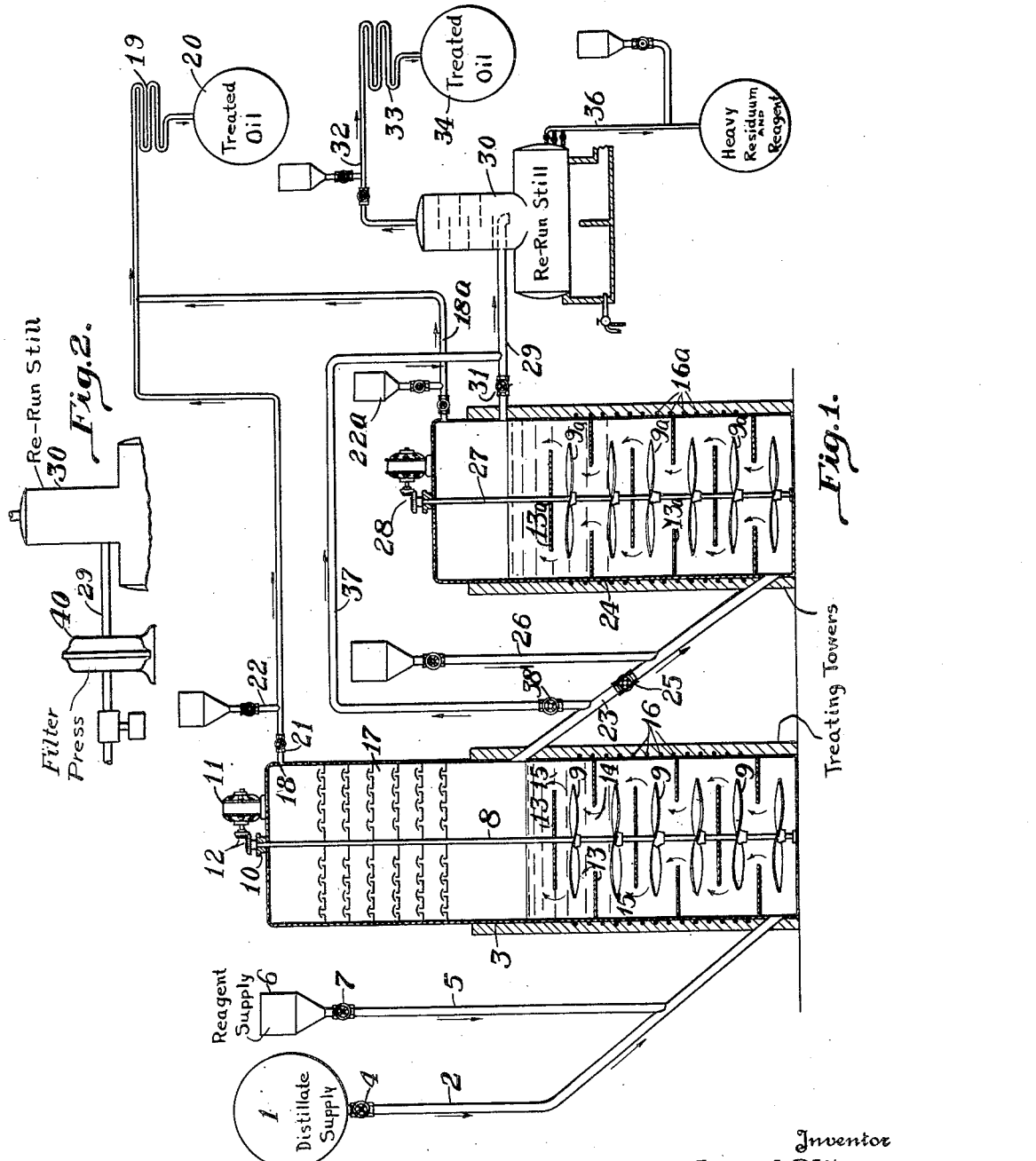
Inventor
Joseph B. Weaver
By W. S. McDowell
Attorney Patented Oct. 10, 1933

1,929,861

UNITED STATES PATENT OFFICE 1,929,861

METHOD AND APPARATUS FOR CONTINUOUSLY TREATING PETROLEUM DISTILLATES

Joseph B. Weaver, New York, N. Y.

Application October 9, 1930. Serial No. 487,458

6 Claims. (Cl. 196—79)

This invention relates to an improved method of and apparatus for continuously treating petroleum oils and distillates, particularly distillates obtained from high temperature converters which, in order to be reduced to a commercial state, frequently require additional treatment following conversion for any one or all of several reasons, such as the treatment of said distillates to obtain a certain desired color, the removal of compounds therefrom which tend to produce gums and resinous products in the distillate upon standing and exposure to light and air, and the removal of foreign substances, such as compounds of sulphur and the like. The present invention provides for the continuous treating of such distillates by the constant and sustained passage thereof through serially connected and externally heated reaction towers, and wherein the distillates during their passage through said towers have intermingled therewith a suitable treating reagent which passes with the distillates during the travel of the latter through the reaction zone afforded by one or both of said towers.

It is another object of the invention to provide the towers with mechanically actuated agitating and propelling means to the end of insuring effective contact between the treating agent and the oils or distillates passing through the towers, the construction and arrangement of the agitating and propelling means being such as to effect generally upward travel of the distillates and the treating agent mixed therewith through said towers.

It is a further object of the invention to provide at least one of said towers with a scrubbing and fractionating section in the upper portion thereof and to maintain the distillates during their passage through this tower at a temperature sufficiently elevated to vaporize the lighter constituents which such distillates contain, in order that the said lighter or low boiling distillates may be removed from the top of said tower in a vaporous form and separated from the higher boiling constituents which usually require additional treatment.

A still further object of the invention resides in maintaining the moving stream comprising the distillates and suitable treating reagents in the liquid phase during the travel of said mixture through the serially related towers, the low boiling vapors removed from the top of the first tower being substantially free in certain instances of the treating agent employed.

The present invention is particularly useful in the treatment of vapor phase cracked distillates which require treatment for gums although, of course, the invention is not limited to this particular field of use and may be employed in many other different operations and capacities.

For a further understanding of the invention, reference is to be had to the following description and the accompanying drawing, wherein has been diagrammatically illustrated apparatus used in carrying the present invention into practical operation, wherein:

Figure 1 is a general view, and
Figure 2 is a detailed view thereof.

Referring more particularly to the drawing, the numeral 1 designates a tank or other container which holds the cracked petroleum distillates or other oils requiring treatment. Leading from the tank 1 is a pipe line 2 which leads to the bottom of a primary treating tower 3. The oil to be treated may flow through the pipe line 2 either by gravity or the line 2 may be provided with a pump (not shown) for effecting this result. A valve 4 is preferably arranged in the line 2 to provide for regulation in the quantity of oil passing through said line. Entering the line 2 at a point between the tank 1 and the bottom of the tower 3 is a second pipe line 5 which leads from a hopper or other container 6 which holds a suitable reagent or treating material. The latter, of course, varies in accordance with the character of the treating operation. If, for example, a vapor phase cracked distillate is to be treated for gum and color, the reagent may consist of fuller's earth which may or may not be treated with an acid capable of promoting polymerization reactions on the part of the cracked distillate in the tower 3. Again, a treating agent, such as sulphuric acid or a dilute sulphuric acid, silica gel or other adsorbent materials or catalysts may be added to the cracked distillates, depending on the nature of the oils undergoing treatment. The line 5 is also provided with a regulating valve 7 for controlling in a proportional manner the delivery of the treating material to the oil supplied to the bottom of the tower 3.

This tower may consist of a cylindrical metallic shell substantially closed, except as hereinafter specified, at its upper and lower ends. Extending axially through the tower and journalled for rotation therein is a shaft 8 which carries at its lower portion a plurality of revolving propellers 9 fixed for rotation in horizontal planes. The upper portion of the shaft is journalled in a packed gland 10 provided in the top of the tower 3 and a motor 11 and suitable power transmission gearing 12 may be used in effecting the rotation of the shaft 8 and its associated propellers 9 at desired and variable rates of speed. Between each of the propellers 9, the tower has provided therein fixed diaphragm plates or baffles 13, alternate baffles being provided with axial openings 14 spaced from the shaft 8 while the remaining baffles are mounted so that their outer circumferential portions will be spaced as at 15 from the inner wall of the tower 3. The rotation of said propellers and the arrangement of the diaphragm baffles effect positive upward travel of the liquid mixture, composed of the distillates and reagent, through the tower 3 in a generally tortuous course, securing a thorough intermingling of the reagent with the oils and expediting certain types of reactions.

Preferably the tower 3 is externally heated and for convenience in illustration, this has been disclosed as consisting of an electric resistance coil or element 16 arranged in the lagging surrounding the lower portion of the tower 3. Any other equivalent heating means however may be used for heating the oil mixture during the passage of the latter through said tower to a desired temperature. It will be understood, however, that the mixture may or may not be additionally heated while passing through said tower although in the handling of cracked petroleum distillates, such heating has been found to be most advantageous. The upper portion of the tower 3 is provided with a dephlegmating section 17, whereby high boiling point oils entrained in low boiling point vapors released from the oils in the tower 3, may be knocked back into the bottom of said tower. The upper portion of the dephlegmating section of the tower is provided with a vapor outlet 18 which leads to a condensing coil 19 in a storage tank 20. The outlet 18 may be provided with a control valve 21 and if desired, a treating line 22 may enter the outlet 18 in order to permit of the introduction, for example, of a sufficient quantity of anhydrous ammonia or other caustic to neutralize the acidity which may be present in said vapors by reason of the addition of the treating reagent in the lower portion of the tower 3. It will be understood that in many instances it will not be necessary to add treating materials to the vapors released from the top of the dephlegmating section 17 inasmuch as such vapors when subsequently condensed and collected usually possess a desired state, and if such vapors are produced from cracked distillates, they are usually found when condensed to produce oils of desired color and free from gum compounds.

Immediately above the propellers 9 provided in the primary tower 3 is an outlet pipe 23 which leads to the bottom of a second treating tower 24, the pipe 23 being utilized for the purpose of transferring a mixture comprising higher boiling oils and treating agent from the tower 3 to the second tower 24. The pipe 23 may be provided with a control valve 25, whereby suitable pressures may be maintained in the tower 3 best adapted for efficient operation and, secondly, the valve 25 may be used for regulating the flow of the oil mixture to the tower 24. A second pipe 26, corresponding to the pipe 5, enters the pipe 23 adjacent to the tower 24 and may be used for introducing, if necessary, an additional quantity of a treating reagent such as has been above described, into the oils entering the tower 24.

The tower 24 corresponds substantially in construction to the tower 3 with the exception that in the form of the apparatus depicted, the dephlegmating section has been omitted but it will be understood that such a section may be added to the tower 24 if it should be found advisable. Thus, the tower 24 is provided with a vertical and axial shaft 27 rotated by a motor and associated transmission gearing 28 at variable range of speed. The shaft 27, within the lower portion of the tower 24, is equipped with propellers 9a and between the propellers 9a are located stationary diagram baffles 13a, the arrangement of said propellers 9a and the baffles 13a being such as to provide for the upward and tortuous travel of the oil-treating agent mixture through the tower 24, substantially as described in relation to the tower 3. The oil-treating agent mixture during its passage through the tower 24 may be heated by means of an electric coil 16a surrounding the lower portion of the tower 24. The latter is provided contiguous to its top with an evaporator 30, and the pipe 29 may be provided with a pressure regulating valve 31 so that the evaporator 30 may operate at a lower pressure as regards the pressures which obtain in the towers 3 and 24. Within the evaporator 30 the lower boiling oils flash into vapor, by reason of the reduced pressures and pass overhead from the top of the evaporator through a valved outlet line 32 and condenser 33 to a storage and collecting tank 34, while the polymerized and high boiling oils, which collect as liquids in the bottom of the evaporator may be withdrawn by way of the valved outlet line 36 as a fuel oil. If desired, the outlet pipe 23 which leads from the tower 3 may be passed directly to the evaporator 30 and connected with the outlet pipe 29, this being accomplished by means of a pipe line 37 provided with a control valve 38. When this latter construction is in operation, the second tower 24 will be shunted and said last named operation is particularly useful in the handling of oils which require but light treatment. The evaporator 30 may or may not be externally heated. A filter press 40 may be inserted in the line 29 to remove the treating reagent, if desired, to permit only oils to enter the rerun still 30.

It is obvious that by varying the height of the towers 3 and 24 an appreciable average pressure effect can be obtained on the liquid under agitation due to the hydraulic head of the liquid. Also it is quite possible to produce a slight vacuum at the top of said towers when it is desired to effect the removal of the greater percentage of the volatiles. Apparatus operating in accordance with the above description effects a very thorough treatment especially of vapor phase cracked distillates for the purpose of effecting through polymerization the removal from such distillates of gum-forming and color-imparting bodies and, moreover, while this result is accomplished quite effectively, the polymerization losses, that is the formation of high boiling point compounds as a result of such treatment, are maintained at a low figure in proportion to the total distillate charged through the system. The system provides for the treatment of the various fractions of the distillate which possess differing boiling ranges continuously without requiring previous fractionation. It also provides for accurate control of the time element of contact between the treating agent and the distillates and by accurately regulating this time of contact, which is acquired after some practical experience, polymerization losses and treating material costs may be maintained at a minimum. The treating agents used are preferably removed from the system with the high boiling polymerized oils taken through the outlet line provided in the lower part of the evaporator, and the agents subsequently separated through suitable apparatus, such as filter presses, from the undesired oils. By removing low boiling compounds from the oils under treatment, optimum treating conditions are established together with a properly controlled polymerization of undesired oils secured. Moreover, the strength or activity of the treating reagent may be regulated, particularly when the light oils are removed, to secure the best operating conditions. This is a matter which can be readily determined in the actual operation of the process and depends upon such variable factors as the character of the oil undergoing treatment, its rate of flow through the treating apparatus and the nature and quantity of the reagent used. The system is flexible, however, and readily lends itself to adjustment in securing or establishing the desired operating conditions.

Vapors developed in the operation of the tower 24 may be released through a line 18a connected with the top thereof and which leads to the coil 19 and the storage tank 20. A neutralizing agent may be introduced into the vapors passing through the line 18a by means of the valve controlled magazine 22a, in which a suitable quantity of such a neutralizing agent is retained and fed in regulated quantities to the line 18a. This arrangement is desirable when an acid treated reagent, as above described, is employed in treating the distillates. Similar means may be provided for neutralizing the oils passing through the line 29 and in connection with the vapors passing through the line 32 from the rerun still 30, depending upon the character of the reagent employed.

What is claimed is:

1. In the treatment of cracked petroleum distillates, the method of removing through polymerization undesirable gum-forming and color-imparting bodies from said distillates, which consists in introducing into a body of untreated distillate a reagent consisting of a finely divided acid treated clay, then passing the mixture composed of such distillates in the liquid phase and reagent in a generally upward direction through a vertical treating zone and simultaneously agitating the mixture during its upward advance through the treating zone, heating the mixture while in said zone to a temperature sufficiently high to vaporize the low boiling constituents contained therein, fractionating the evolved vapors and separately condensing and collecting said vapors, removing from adjacent the upper portion of said tower the balance of the mixture composed of high boiling oils and said reagent, and subjecting the last named mixture to redistillation under temperatures higher than those prevailing in the treating zone to separate from said mixture the reagent and undesirable high boiling compounds from the desired low boiling compounds.

2. A method of treating cracked hydrocarbon distillates to remove therefrom through polymerization undesirable gum-forming and color-imparting bodies, which consists in passing a mixture composed of such distillates in substantially the liquid phase and a polymerizing reagent upwardly in concurrent flow through a heated distillation zone, in regulating the temperature of the mixture passing through said zone to vaporize and remove therefrom oils of low boiling range, then passing the remaining higher boiling oils through a second distillation zone, and controlling the temperature in said last named zone to effect the separation of desired low boiling oils from the undesired higher boiling oils and polymerized compounds.

3. In the treatment of cracked petroleum distillates to remove therefrom through polymerization deleterious compounds, which comprises the steps of producing an intimate mixture of such distillates with an acidified reagent, positively advancing the mixture as a liquid in a generally upward direction through a heated treating zone, heating the mixture during its upward passage through said zone to a temperature sufficiently high to vaporize the low boiling oils contained therein, separately removing from the treating zone the vaporized oils of low boiling range from the liquid oils of higher boiling range, introducing into the vapors discharged from said treating zone a neutralizing agent and condensing and collecting said vapors, passing the oils of higher boiling range from said treating zone into a distillation zone, and heating the oils delivered to said distillation zone sufficiently to liberate treated vapors from the higher boiling polymerized oils and separately removing from said distillation zone the treated vapors and said higher boiling polymerized oils.

4. A method of treating cracked hydrocarbon distillates to remove therefrom objectionable constituents, which consists in introducing into a body of such distillates a polymerization promoting reagent, passing the resultant mixture through a series of successive treating towers wherein said mixture is caused to advance in a generally upward direction through each of said towers, heating the mixture while it is in substantially the liquid phase during its passage through said towers to liberate therefrom as vapors oils of low boiling range, introducing a neutralizing agent into the vapors released from said towers, and treating the high boiling oil reagent mixture discharged from the last of said towers to remove the polymerizing reagent together with he undesirable oil compounds from the treated oils.

5. Apparatus for refining hydrocarbon oils comprising a tower provided with a vertical treating chamber, means for introducing a mixture composed of the oil to be treated and a reagent into the bottom of said chamber, a vertically extending shaft journaled for rotation axially within said chamber, horizontal propellers carired by said shaft in vertically spaced order and rotatable in unison therewith, stationary baffles arranged between said propellers, means for rotating said shaft and propellers whereby to positively advance said mixture in a generally upward direction through said chamber and in a tortuous path provided by the baffles, means for heating the mixture during its upward movement through said chamber to effect vaporization of the lower boiling oils contained therein, fractionating means arranged in the upper portion of said chamber to eliminate from said vapors undesired higher boiling oils, means for recovering vapors removed from the upper portion of said chamber as a condensate, and a draw-off line communicating with said chamber at a position between said baffles and said fractionating means for removing unvaporized oils and treating reagent from said chamber at a position substantially above said propellers.

6. Apparatus for refining hydrocarbon oils comprising a vertically disposed treating tower, means for introducing into the bottom of said tower a mixture composed of the oils to be refined and a treating reagent, a shaft journaled for rotation within said tower, propellers secured to said shaft in vertically spaced order and rotatable therewith, means for imparting rotary movement to said shaft and propellers, stationary baffles arranged between said propellers and operative to cause the oil-reagent mixture to follow a tortuous path during upward movement of said mixture through said tower under forces imparted to the mixture by the rotation of said propellers, means for heating the mixture while in said tower, a vapor outlet communicating with the upper end of said tower and a draw-off line communicating with said tower at a position substantially above said baffles and propellers and below the vapor outlet to remove the mixture from said tower following predetermined travel thereof through the tower in an upward direction.

JOSEPH B. WEAVER.